(12) United States Patent
Islam et al.

(10) Patent No.: US 12,484,019 B2
(45) Date of Patent: Nov. 25, 2025

(54) TECHNIQUES FOR PAGING EARLY INDICATION FOR UE POWER SAVING IN IDLE/INACTIVE STATE

(71) Applicant: Intel Corporation, Santa Clara, CA (US)

(72) Inventors: Toufiqul Islam, Santa Clara, CA (US); Debdeep Chatterjee, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/957,885

(22) Filed: Sep. 30, 2022

(65) Prior Publication Data

US 2023/0037852 A1     Feb. 9, 2023

Related U.S. Application Data

(60) Provisional application No. 63/251,531, filed on Oct. 1, 2021.

(51) Int. Cl.
    *H04W 68/02*      (2009.01)
    *H04W 72/23*      (2023.01)

(52) U.S. Cl.
    CPC .......... *H04W 68/02* (2013.01); *H04W 72/23* (2023.01)

(58) Field of Classification Search
CPC . H04W 68/02; H04W 68/025; H04W 68/005; H04W 72/23; H04W 12/06; H04W 12/068; H04W 12/069; H04W 12/69; H04W 16/28; H04W 48/08; H04W 48/16; H04W 52/0225; H04W 52/0232; H04W 52/0235; H04W 72/044; H04W 72/232; H04W 76/20; H04W 80/10; H04W 84/12; H04W 88/04; H04L 5/0048; H04L 5/0051; H04L 5/0053; H04L 5/0094; H04L 67/12; H04L 12/12; H04L 41/082; H04L 49/253; H04L 5/0007; H04L 5/0092; H04L 63/0823; H04L 65/1016; H04L 65/1063; H04L 65/1069; H04L 65/1104; H04L 65/4015; H04L 67/04; H04L 67/06; H04L 67/10; H04L 67/303; H04L 67/34; Y02D 30/70; G06F 11/26; G06F 13/00; G06F 13/4022; G06F 21/82; G06F 8/60; G06F 8/61; G06F 8/65; G06Q 50/01
See application file for complete search history.

(56) References Cited

U.S. PATENT DOCUMENTS

| | | | |
|---|---|---|---|
| 2023/0051117 A1* | 2/2023 | Tsai | H04L 5/0048 |
| 2023/0075197 A1* | 3/2023 | Xu | H04W 56/001 |
| 2024/0089914 A1* | 3/2024 | Nagano | H04W 68/02 |
| 2024/0187988 A1* | 6/2024 | Maleki | H04W 52/0216 |

(Continued)

OTHER PUBLICATIONS

Ruyue (Power Saving Techniques for 5G and Beyond; IEEE, Jun. 2020) (Year: 2020).*

(Continued)

*Primary Examiner* — Hirdepal Singh
(74) *Attorney, Agent, or Firm* — Schwegman Lundberg & Woessner, P.A.

(57) ABSTRACT

Various embodiments herein provide techniques paging early indication for a user equipment in an idle and/or inactive state. Other embodiments may be described and claimed.

10 Claims, 7 Drawing Sheets

(56) References Cited

U.S. PATENT DOCUMENTS

2024/0284403 A1* 8/2024 Agiwal ................ H04W 68/02
2024/0381307 A1* 11/2024 Reial .................. H04W 68/005

OTHER PUBLICATIONS

3GPP, "Technical Specification Group Radio Access Network; NR; User Equipment (UE) procedures in Idle mode and RRC Inactive state (Release 16)," 3GPP TS 38.304 V16.6.0 (Sep. 2021), 5G, 39 pages.

* cited by examiner

700

```
┌─────────────────────────────────────────────┐
│ encoding, for transmission to a user equipment (UE), │
│ configuration information for physical downlink control │
│ channel (PDCCH)-based paging early indication (PEI) for │
│ use by the UE while the UE is in an idle mode or an │
│ inactive mode, wherein the configuration information │
│ includes one or more of: a payload size, a radio network │
│ temporary identifier (RNTI), or a number of subgroups │
│ per paging occasion │
│ 702 │
└─────────────────────────────────────────────┘
                        │
                        ▼
┌─────────────────────────────────────────────┐
│ encoding a PDCCH for transmission in a common search │
│ space based on the configuration information │
│ 704 │
└─────────────────────────────────────────────┘
```

Figure 7

TECHNIQUES FOR PAGING EARLY INDICATION FOR UE POWER SAVING IN IDLE/INACTIVE STATE

CROSS REFERENCE TO RELATED APPLICATION

The present application claims priority to U.S. Provisional Patent Application No. 63/251,531, which was filed Oct. 1, 2021; the disclosure of which is hereby incorporated by reference.

FIELD

Various embodiments generally may relate to the field of wireless communications. For example, some embodiments may relate to techniques for paging early indication for user equipment (UE) power saving in idle and/or inactive state.

BACKGROUND

Energy efficiency is of paramount importance for operation of 5G/NR UEs, which may have a diverse range of supported applications compared to LTE devices. In idle/inactive mode, UE may periodically wake up to receive paging messages from network. Paging messages can be received in paging occasions (PO) within a duration, such as within a paging frame. Paging messages are transmitted on a PDCCH with a shared RNTI such as P-RNTI. UE operates in discontinuous reception (DRX) mode and wakes up at POs to receive the paging message. However, it may be possible that no paging messages are transmitted at the POs. One of the major sources of power consumption during idle/inactive mode for NR UE is when UE wakes up but does not receive paging message or identifies that paging message is not intended for the UE. Hence, to avoid unnecessary paging message monitoring/receptions, UE may be explicitly indicated by the network to wake up only at POs where network may send paging messages intended for the UE. Wake up signal (WUS) has been considered in idle mode before in LTE, for MTC and NB-IoT devices. Wake up signal can also be introduced for NR UE in idle/inactive mode, at least when standalone NR transmission is used. Note that WUS may also be referred to as paging early indication (PEI), e.g., WUS may indicate the UE whether UE may expect to receive paging message in the next PO.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 7 illustrates another example process to practice various embodiments described herein.

DETAILED DESCRIPTION

Figure 1:
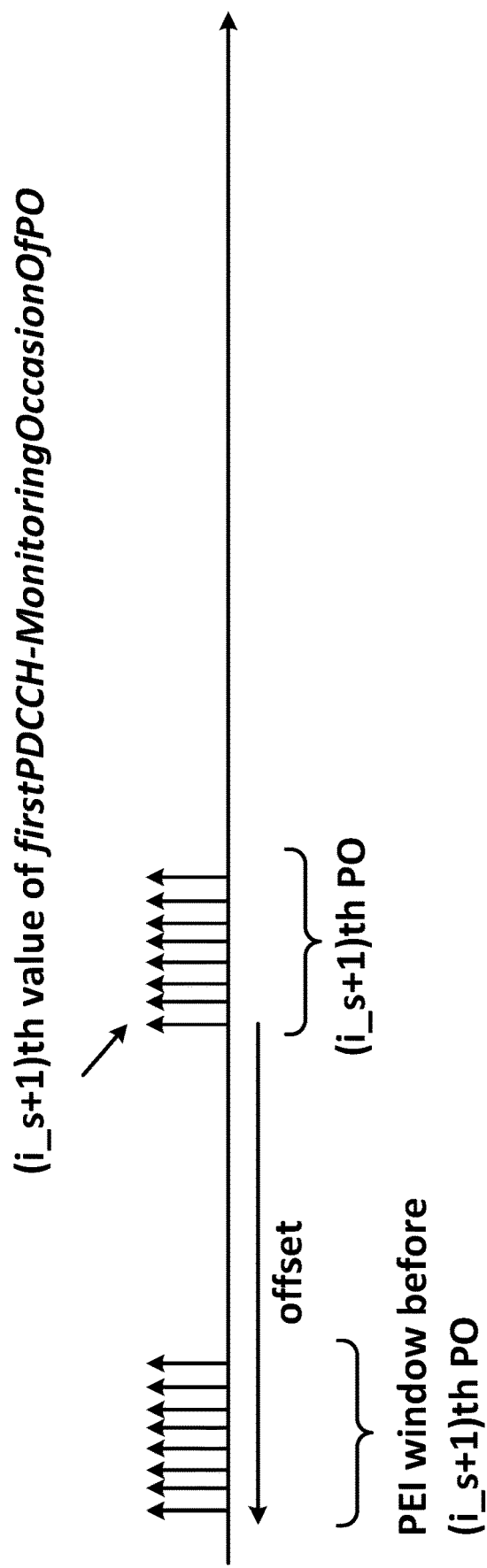
FIG. 1 illustrates identification of measurement occasions (MOs) of paging early indication (PEI) with paging search space before a paging occasion (PO), when 1 PEI is associated with 1 PO, in accordance with various embodiments.
Figure 2:
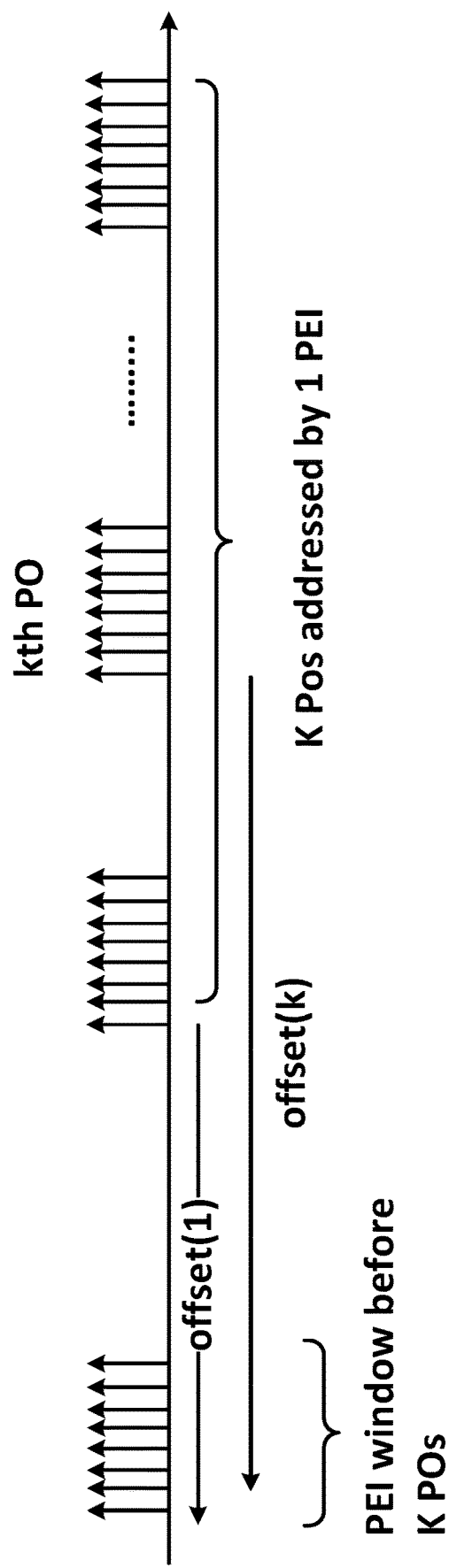
FIG. 2 illustrates identification of MOs of PEI based on paging search space when PEI addresses multiple POs, in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Various embodiments herein provide design details of PDCCH based wake-up signal (WUS) or paging early indication (PEI).

Configuration of PDCCH based PEI

In one embodiment, if a UE operating in idle/inactive mode is configured by higher layers with parameter such as PagingEarlyIndication or provided with a configuration of the PDCCH based PEI such as via system information block (SIB), the UE is provided one or more of the following via higher layer signaling such as SIB or dedicated RRC signaling:

a common RNTI such as P-RNTI or PEI-RNTI where the CRC of the DCI format x-y for transmission of the PDCCH based PEI is scrambled by that RNTI for monitoring the DCI format in one or more search space sets on the primary cell of the MCG a payload size of DCI format x-y such as by a higher layer parameter size-DCI-x-y, if the payload is configurable. Alternatively, the payload of the DCI format x-y can be fixed as well.

Identifier what information will be contained in the DCI format x-y, such as the DCI format can be used to provide information on one or more of: UE sub-grouping information, TRS availability indication in idle/inactive mode, where the information is common to a group of UEs or all UEs camped in the carrier In one example, of the payload of K bits, a N bit block can be used for UE sub-grouping information (if configured to be included in the DCI format), and M bit block can be used for TRS availability indication (if configured to be included in the DCI format) and M+N≤K holds. In one example, payload can be fixed at K=12 bits and if M+N is less than K, padding bits are added to reach overall K bit payload. In one example, M can be up to 8 bits (e.g., values of M can be one of 1, 2, 4, 6, 8 etc.) and K can be up to 6 or 8 bits (e.g., values of K can be one of 1, 2, 4, 6, 8 etc.). In one example, if x=2, then y can be 7, 8, 9, 10 etc. Alternatively, if x=3, then y can be 1, 2, 3, . . . , 5, 6 etc.

In one example, each of block of M and N bits is a bitmap, where each bit of M bit block map to a UE paging sub-group or a set of UE paging sub-groups where the sub-groups addressed by the M bit block may belong to one or multiple paging occasions (POs), and each bit of N bits map to a TRS resource or a TRS resource set or a group of TRS resource sets or a TRS configuration or a set of TRS configurations. Alternatively, N bit block can be codepoint based as well, e.g., a certain combination of bit values of N bit map to a TRS resource or a TRS resource set or a group of TRS resource sets or a TRS configuration or a set of TRS configurations. For example, if a codepoint is indicated, this could imply the TRS occasions associated with the corresponding TRS resource or a TRS resource set or a group of TRS resource sets or a TRS configuration or a set of TRS configurations are available. Default can be assumed as unavailable.

Higher layer parameter on configured number of sub-groups per PO or size of the bitmap for UE sub-grouping information is provided. Similarly, configured number of TRS resource or a TRS resource set or a group of TRS resource sets or a TRS configuration or a set of TRS configurations for indication via bitmap or codepoint by PEI is provided to the UE by higher layer parameter.

In one example, UE may be provided with value of one or both of M and N bits that comprise K bit payload. For example, if M+N=K and N bit block is situated after the M bit block within the payload, then UE may be only provided information of M bits or value of M.

In one example, bit value of 0 (1) for each of M bit bitmap implies the corresponding UE paging sub-group to wake up and monitor (do not monitor) the associated PO (e.g., the PO belonging to the sub-group)

In one example, M bits can be further divided into L≥1 bit segments, where each segment provides UE paging sub grouping information for a PO. This can be useful when PEI indicates sub-grouping information for J=M/L POs (assuming M is divisible by L) and there is a L bit bitmap for indicating wake up information for L sub-groups per PO.

In one example, bit value of 0 (1) for each of N bit bitmap implies the TRS occasions associated with the corresponding TRS resource or a TRS resource set or a group of TRS resource sets or a TRS configuration or a set of TRS configurations is unavailable (available). If indicated available, it implies UE would assume TRS will actually be transmitted in the occasions during a period for which the indication is valid, and otherwise if indicated unavailable.

CORESET information, e.g., the index of CORESET that will be used to monitor for DCI format x-y.
In one example, CORESET 0 can be used to monitor. Alternatively, a dedicated CORESET can be configured for monitoring DCI format x-y.

SS set configuration(s), such as one or more common search space set (CSS) configuration which can be the paging search space (e.g., Type 2 PDCCH CSS set) and/or another CSS (e.g., Type 0, 0A, 1, 3 etc).

In one example, if search space set of index 0 is used then the PDCCH monitoring occasions for PEI are same as for RMSI as defined in clause 13 in TS 38.213

An offset to identify the monitoring occasions before PO, where the offset can be obtained with respect to the start of next PO or the start of the first in a group of consecutive POs or a separate reference point such as start of paging frame or DRX cycle or location of an SSB.

In one example, the offset can be expressed in number of MOs, number of symbol(s) or slot(s) based on a given numerology or based on the numerology of the active DL BWP.

In one example, offset can be used to derive MOs based on the configured MOs that comprise a PO or a group of POs based on an existing CSS such as paging search space.

Parameters to identify the start of MOs (e.g., firstPDCCH-MonitoringOccasionOfPEI-Window) and number of monitoring occasions (MOs) per SSB such as nrofPDCCH-MonitoringOccasionPerSSB-InPEI-Window (e.g., in multi-beam operations, there can be one or more MOs configured per SSB, and gNB may transmit the PEI on one or multiple beams) that comprise the total MOs for PEI monitoring or the window for PEI monitoring before a PO or a group of POs according to a CSS. In this example, The monitoring window for PEI is a set of 'S*X' consecutive PDCCH monitoring occasions where 'S' is the number of actual transmitted SSBs determined according to ssb-PositionsInBurst in SIB1 and X is the number of PDCCH MOs per SSB such as indicated by a parameter nrofPDCCH-MonitoringOccasionPerSSB-In-PEI-Window if configured or is equal to 1 otherwise. Alternatively, X can be obtained from nrofPDCCH-MonitoringOccasionPerSSB-InPO. Refer to TS 38.304 for definitions where applicable.

CCE Aggregation Levels (ALs), such as 1, 2, 4, 8, 16, and maximum number of PDCCH candidates per CCE AL. Alternatively, these can be specified and not separately provided as configuration. Example is provided below in Table 1.

TABLE 1

| CCE ALs and numbers of candidates for PDCCH CSS set for PEI monitoring. | |
| --- | --- |
| CCE Aggregation Level | Number of Candidates |
| 4 | 4 |
| 8 | 2 |
| 16 | 1 |

Identification of MOs for PEI Monitoring

A UE configured to monitor PEI, may do so over one or more MOs before the PO, and the location of the MOs can be at an offset before the PO. There can be several ways for the UE to identify valid or correct MOs for PEI monitoring before a PO.

In one embodiment, a common search space can be configured or associated for PEI monitoring where identification of MOs can be based on one or more of: Parameters to identify start of monitoring occasions before a PO or group of POs, and number of MOs per SSB (assuming multi-beam operations), e.g., within a paging frame or a DRX cycle. As indicated in the above embodiment, such parameters termed as an example, firstPDCCH-MonitoringOccasionOfPEI-Window and nrofPDCCH-MonitoringOccasionPerSSB-InPEI-Window respectively. If PEI is associated with or addresses K≥1 POs (e.g., provides UE paging sub-grouping information for K sub-sequent or following POs.), then in one example, POs within a paging frame or DRX cycle can be assembled into multiple groups of POs, where each group comprises K POs. For example, index of the group can be i=0, 1, 2, ..., P−1 where there are P groups of POs within a paging frame or DRX cycle. Then, for ith group, the starting PDCCH monitoring occasion within PEI window is the ith index value of the firstPDCCH-MonitoringOccasionOfPEI-window parameter; otherwise, it is equal to i*S*X.

In another embodiment, PDCCH MOs for PEI can be derived from PDCCH MOs of a PO. In one example, if paging search space is used, following procedure can be used.

If a PEI is associated with one PO only, then start of monitoring occasions for PEI before (i_s+1)th PO can be obtained as (i_s+1)th value in firstPDCCH-MonitoringOccasionOfPO—offset, where offset is expressed in number of MOs. In other words, S*X MOs of PEI can be obtained at an offset before the S*X MOs comprising the PO which is addressed by the PEI, where the first MO of the S*X MOs of PEI is obtained as (i_s+1)th value in firstPDCCH-MonitoringOccasionOfPO—offset. FIG. 1 shows how first MO of PEI monitoring before (i_s+1)th PO can be obtained at an offset before the first MO of PO. In this example, it is assumed that each of PEI monitoring window and PO comprises S*X consecutive MOs in total. If firstPDCCH-MonitoringOccasionOfPO is not provided, then first MO of PEI monitoring before (i_s+1)th PO can be obtained as i_s*S*X—offset. Please refer to TS 38.304 v 16.1 for definitions of firstPDCCH-MonitoringOccasionOfPO. Here, S and X are provided by ssb-PositionsInBurst in SIB1 and nrofPDCCH-MonitoringOccasionPerSSB-InPO, respectively. If nrofPDCCH-MonitoringOccasionPerSSB-InPO is not configured, then value is 1. In this example, first MO for PEI monitoring is identified at an offset before the first MO of the PO addressed by the PEI.

If a PEI is associated with K POs, different offsets may need to be applied depending on which of K POs UE is monitoring. In one example, K offset values can be configured, offset(k), k=1, ..., K. For example, if the UE is monitoring (i_s+1)th PO in a paging frame or DRX cycle, and that PO happens to be the kth PO within the group of K POs addressed by the PEI, then UE identifies first MO of PEI as (i_s+1)th value in firstPDCCH-MonaoringOccasionOfPO—offset(k). If firstPDCCH-MonaoringOccasionOfPO is not available, then first MO of PEI is obtained as i_s*S*X—offset(k).

In the above embodiments and their examples, it is suggested that the offset may be defined in terms of the PDCCH MOs. As an alternative, in the above embodiments and their examples, the offset may be defined in units of slots or absolute time units, with appropriate translation to enable identification of the latest PDCCH MO(s) associated with the corresponding PDCCH CSS set that may occur at least a certain duration, given by the offset, before the first PDCCH monitoring occasion for the PO. Further, the values of the minimum offset may be defined separately for different subcarrier spacing (SCS) of the initial DL BWP in which the UE is configured with PDCCH Type 2 CSS set for paging monitoring.

In an embodiment, the value of the minimum offset between the last PDCCH MO for PEI reception and the first PDCCH MO for corresponding one or the first of a number of POs may be reported from a set of specified values as UE capability. In a further example, the UE-reported value may be defined as an additional margin to a default value of the minimum offset.

In one embodiment, UE may report a capability to indicate a minimum value of offset to identify the start of MOs for PEI before a PO. Alternatively, UE may report a capability to indicate a minimum value of time gap between the last MO of PEI and start of PO. This would imply that UE would expect last MO of the S*X MOs for PEI would be before the minimum time gap before PO, reported by the UE. In one example, UE is not required to monitor any MOs if it overlaps with the minimum time gap reported by the UE.

In one embodiment, if the PEI includes TRS availability indication information and also UE paging sub-grouping information, following UE procedures are possible A UE may detect the PEI and follow the TRS availability indication (e.g., assume availability or unavailability of TRS occasions for a subsequent duration based on indication by the PEI) regardless of whether PEI indicates wake up or not for UE's paging group or sub-group. In this case, following the TRS availability indication by PEI can be independent of whether PEI includes wake up information of the UE's paging group/sub-group or not.

A UE may follow the TRS availability indication only if PEI indicates wake-up for UE's paging group or sub-group. For example, if PEI indicates TRS availability indication, then the indicated availability or unavailability of TRS occasions as indicated by PEI is only assumed or followed by the UEs for which its corresponding sub-group is paged or wake-up indication is received in PEI. A UE belonging to a group or sub group that is not indicated to wake up by the PEI may ignore (or is not required to follow) the TRS availability indication.

Systems and Implementations

Figure 3:
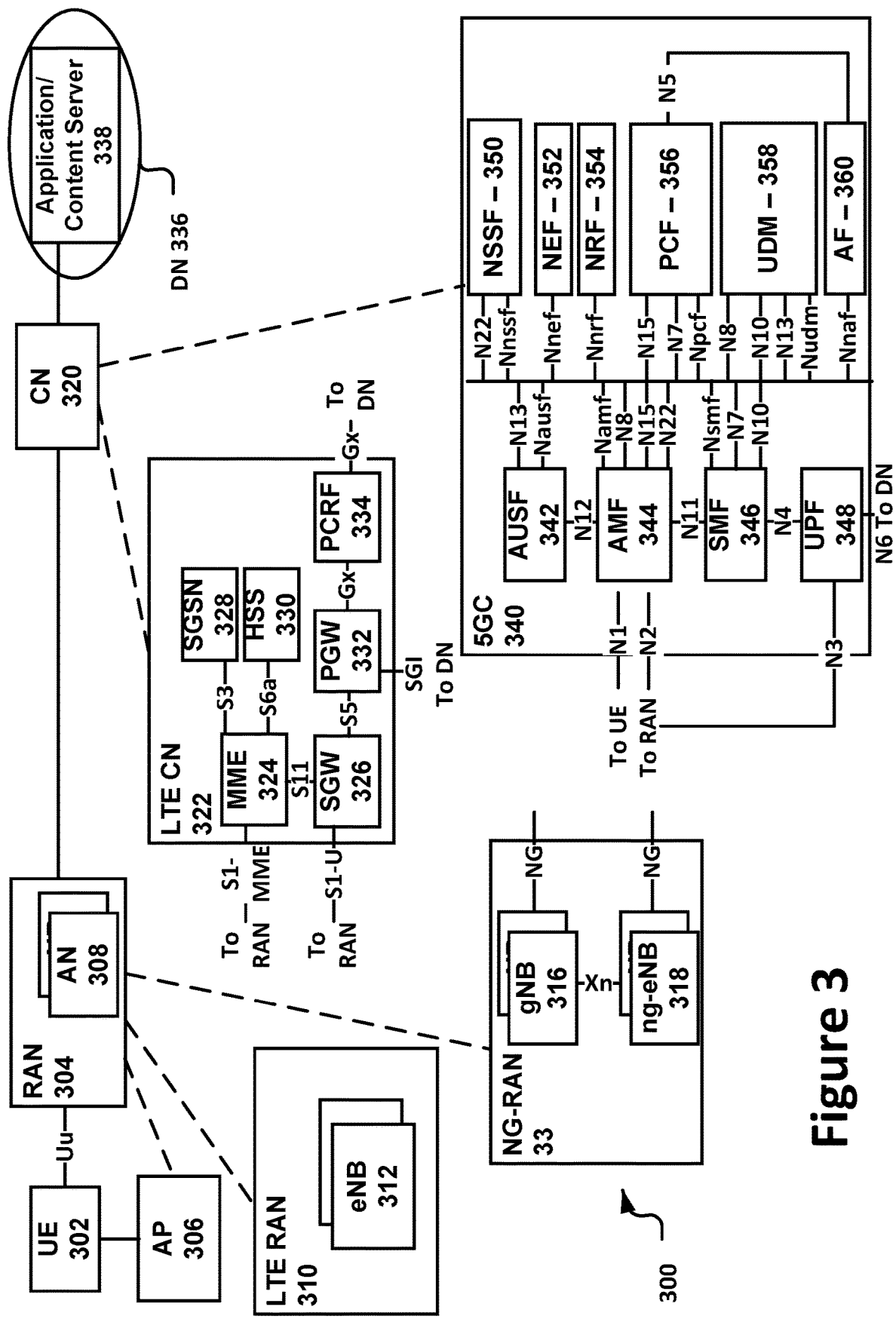
FIG. 3 schematically illustrates a wireless network in accordance with various embodiments.
Figure 4:
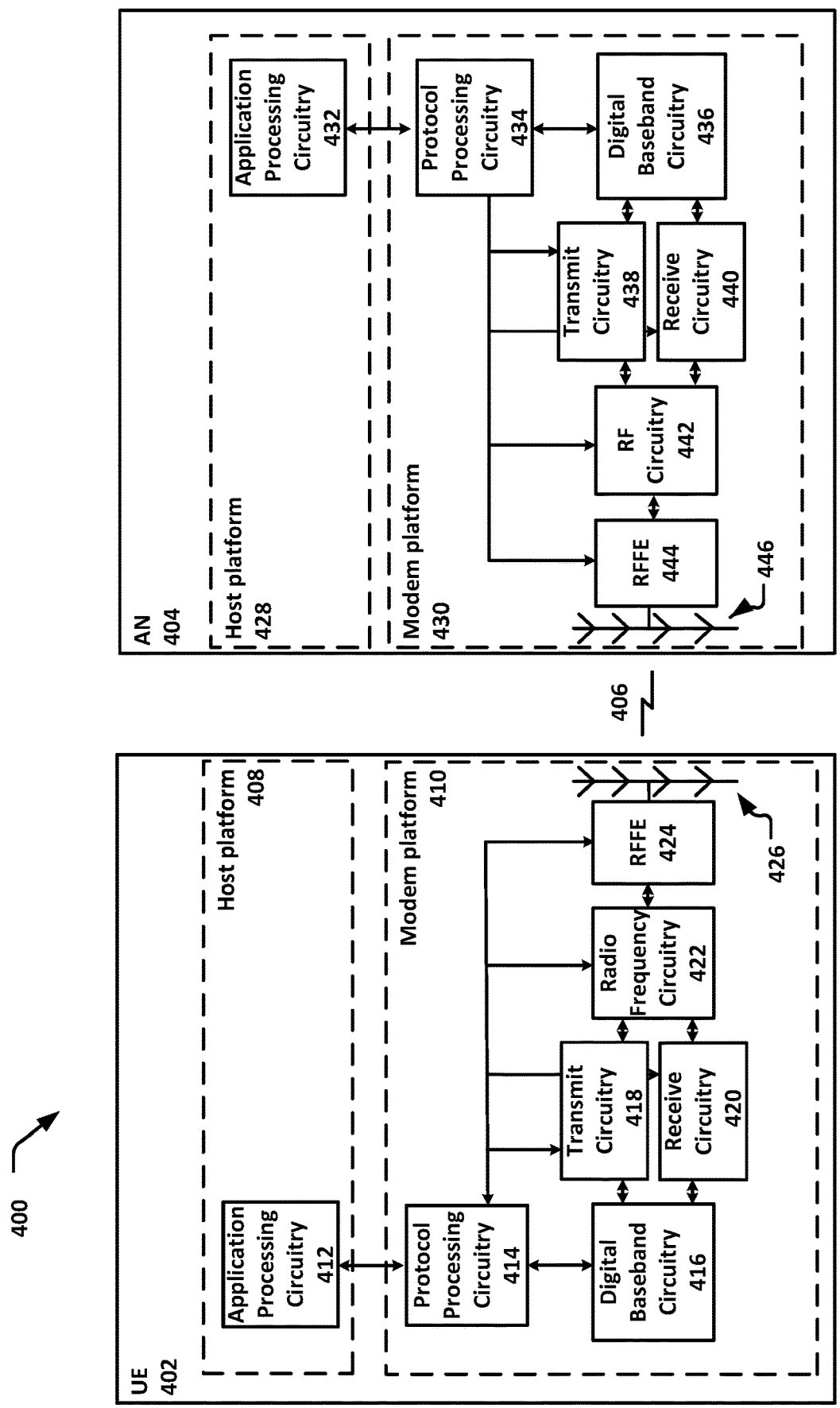
FIG. 4 schematically illustrates components of a wireless network in accordance with various embodiments.
Figure 5:
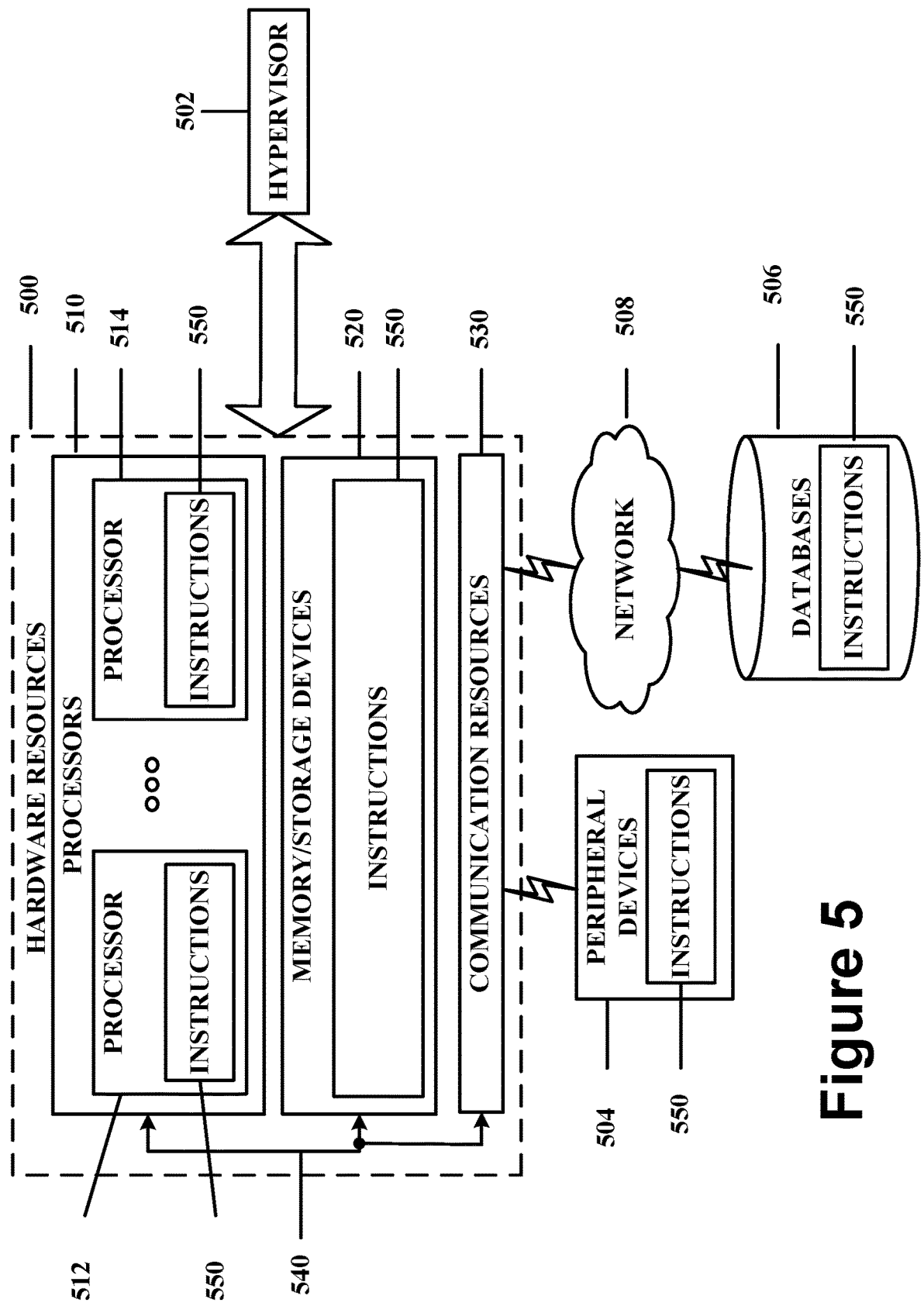
FIG. 5 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 3-5 illustrate various systems, devices, and components that may implement aspects of disclosed embodiments.

FIG. 3 illustrates a network 300 in accordance with various embodiments. The network 300 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 300 may include a UE 302, which may include any mobile or non-mobile computing device designed to communicate with a RAN 304 via an over-the-air connection. The UE 302 may be communicatively coupled with the RAN 304 by a Uu interface. The UE 302 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 300 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 302 may additionally communicate with an AP 306 via an over-the-air connection. The AP 306 may manage a WLAN connection, which may serve to offload some/all network traffic from the RAN 304. The connection between the UE 302 and the AP 306 may be consistent with any IEEE 802.11 protocol, wherein the AP 306 could be a wireless fidelity (Wi-Fi®) router. In some embodiments, the UE 302, RAN 304, and AP 306 may utilize cellular-WLAN aggregation (for example, LWA/LWIP). Cellular-WLAN aggregation may involve the UE 302 being configured by the RAN 304 to utilize both cellular radio resources and WLAN resources.

The RAN 304 may include one or more access nodes, for example, AN 308. AN 308 may terminate air-interface protocols for the UE 302 by providing access stratum protocols including RRC, PDCP, RLC, MAC, and L1 protocols. In this manner, the AN 308 may enable data/voice connectivity between CN 320 and the UE 302. In some embodiments, the AN 308 may be implemented in a discrete device or as one or more software entities running on server computers as part of, for example, a virtual network, which may be referred to as a CRAN or virtual baseband unit pool. The AN 308 be referred to as a BS, gNB, RAN node, eNB, ng-eNB, NodeB, RSU, TRxP, TRP, etc. The AN 308 may be a macrocell base station or a low power base station for providing femtocells, picocells or other like cells having smaller coverage areas, smaller user capacity, or higher bandwidth compared to macrocells.

In embodiments in which the RAN 304 includes a plurality of ANs, they may be coupled with one another via an X2 interface (if the RAN 304 is an LTE RAN) or an Xn interface (if the RAN 304 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 304 may each manage one or more cells, cell groups, component carriers, etc. to provide the UE 302 with an air interface for network access. The UE 302 may be simultaneously connected with a plurality of cells provided by the same or different ANs of the RAN 304. For example, the UE 302 and RAN 304 may use carrier aggregation to allow the UE 302 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 304 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 302 or AN 308 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 304 may be an LTE RAN 310 with eNBs, for example, eNB 312. The LTE RAN 310 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 304 may be an NG-RAN 314 with gNBs, for example, gNB 316, or ng-eNBs, for example, ng-eNB 318. The gNB 316 may connect with 5G-enabled UEs using a 5G NR interface. The gNB 316 may connect with a 5G core through an NG interface, which may include an N2 interface or an N3 interface. The ng-eNB 318 may also connect with the 5G core through an NG interface, but may connect with a UE via an LTE air interface. The gNB 316 and the ng-eNB 318 may connect with each other over an Xn interface.

In some embodiments, the NG interface may be split into two parts, an NG user plane (NG-U) interface, which carries traffic data between the nodes of the NG-RAN 314 and a UPF 348 (e.g., N3 interface), and an NG control plane (NG-C) interface, which is a signaling interface between the nodes of the NG-RAN 314 and an AMF 344 (e.g., N2 interface).

The NG-RAN 314 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 302 can be configured with multiple BWPs where each BWP configuration has a different SCS. When a BWP change is indicated to the UE 302, the SCS of the transmission is changed as well. Another use case example of BWP is related to power saving. In particular, multiple BWPs can be configured for the UE 302 with different amount of frequency resources (for example, PRBs) to support data transmission under different traffic loading scenarios. A BWP containing a smaller number of PRBs can be used for data transmission with small traffic load while allowing power saving at the UE 302 and in some cases at the gNB 316. A BWP containing a larger number of PRBs can be used for scenarios with higher traffic load.

The RAN 304 is communicatively coupled to CN 320 that includes network elements to provide various functions to support data and telecommunications services to customers/subscribers (for example, users of UE 302). The components of the CN 320 may be implemented in one physical node or separate physical nodes. In some embodiments, NFV may be utilized to virtualize any or all of the functions provided by the network elements of the CN 320 onto physical compute/storage resources in servers, switches, etc. A logical instantiation of the CN 320 may be referred to as a network slice, and a logical instantiation of a portion of the CN 320 may be referred to as a network sub-slice.

In some embodiments, the CN 320 may be an LTE CN 322, which may also be referred to as an EPC. The LTE CN 322 may include MME 324, SGW 326, SGSN 328, HSS 330, PGW 332, and PCRF 334 coupled with one another over interfaces (or "reference points") as shown. Functions of the elements of the LTE CN 322 may be briefly introduced as follows.

The MME 324 may implement mobility management functions to track a current location of the UE 302 to facilitate paging, bearer activation/deactivation, handovers, gateway selection, authentication, etc.

The SGW 326 may terminate an Si interface toward the RAN and route data packets between the RAN and the LTE CN 322. The SGW 326 may be a local mobility anchor point for inter-RAN node handovers and also may provide an anchor for inter-3GPP mobility. Other responsibilities may include lawful intercept, charging, and some policy enforcement.

The SGSN 328 may track a location of the UE 302 and perform security functions and access control. In addition, the SGSN 328 may perform inter-EPC node signaling for mobility between different RAT networks; PDN and S-GW selection as specified by MME 324; MME selection for handovers; etc. The S3 reference point between the MME 324 and the SGSN 328 may enable user and bearer information exchange for inter-3GPP access network mobility in idle/active states.

The HSS 330 may include a database for network users, including subscription-related information to support the network entities' handling of communication sessions. The HSS 330 can provide support for routing/roaming, authentication, authorization, naming/addressing resolution, location dependencies, etc. An S6a reference point between the HSS 330 and the MME 324 may enable transfer of subscription and authentication data for authenticating/authorizing user access to the LTE CN 320.

The PGW 332 may terminate an SGi interface toward a data network (DN) 336 that may include an application/content server 338. The PGW 332 may route data packets between the LTE CN 322 and the data network 336. The PGW 332 may be coupled with the SGW 326 by an S5 reference point to facilitate user plane tunneling and tunnel management. The PGW 332 may further include a node for policy enforcement and charging data collection (for example, PCEF). Additionally, the SGi reference point between the PGW 332 and the data network 336 may be an operator external public, a private PDN, or an intra-operator packet data network, for example, for provision of IMS services. The PGW 332 may be coupled with a PCRF 334 via a Gx reference point.

The PCRF 334 is the policy and charging control element of the LTE CN 322. The PCRF 334 may be communicatively coupled to the app/content server 338 to determine appropriate QoS and charging parameters for service flows. The PCRF 332 may provision associated rules into a PCEF (via Gx reference point) with appropriate TFT and QCI.

In some embodiments, the CN 320 may be a 5GC 340. The 5GC 340 may include an AUSF 342, AMF 344, SMF 346, UPF 348, NSSF 350, NEF 352, NRF 354, PCF 356, UDM 358, and AF 360 coupled with one another over interfaces (or "reference points") as shown. Functions of the elements of the 5GC 340 may be briefly introduced as follows.

The AUSF 342 may store data for authentication of UE 302 and handle authentication-related functionality. The AUSF 342 may facilitate a common authentication framework for various access types. In addition to communicating with other elements of the 5GC 340 over reference points as shown, the AUSF 342 may exhibit an Nausf service-based interface.

The AMF 344 may allow other functions of the 5GC 340 to communicate with the UE 302 and the RAN 304 and to subscribe to notifications about mobility events with respect to the UE 302. The AMF 344 may be responsible for registration management (for example, for registering UE 302), connection management, reachability management, mobility management, lawful interception of AMF-related events, and access authentication and authorization. The AMF 344 may provide transport for SM messages between the UE 302 and the SMF 346, and act as a transparent proxy for routing SM messages. AMF 344 may also provide transport for SMS messages between UE 302 and an SMSF. AMF 344 may interact with the AUSF 342 and the UE 302 to perform various security anchor and context management functions. Furthermore, AMF 344 may be a termination point of a RAN CP interface, which may include or be an N2 reference point between the RAN 304 and the AMF 344; and the AMF 344 may be a termination point of NAS (N1) signaling, and perform NAS ciphering and integrity protection. AMF 344 may also support NAS signaling with the UE 302 over an N3 IWF interface.

The SMF 346 may be responsible for SM (for example, session establishment, tunnel management between UPF 348 and AN 308); UE IP address allocation and management (including optional authorization); selection and control of UP function; configuring traffic steering at UPF 348 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 344 over N2 to AN 308; and determining SSC mode of a session. SM may refer to management of a PDU session, and a PDU session or "session" may refer to a PDU connectivity service that provides or enables the exchange of PDUs between the UE 302 and the data network 336.

The UPF 348 may act as an anchor point for intra-RAT and inter-RAT mobility, an external PDU session point of interconnect to data network 336, and a branching point to support multi-homed PDU session. The UPF 348 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 348 may include an uplink classifier to support routing traffic flows to a data network.

The NSSF 350 may select a set of network slice instances serving the UE 302. The NSSF 350 may also determine allowed NSSAI and the mapping to the subscribed S-NS-SAIs, if needed. The NSSF 350 may also determine the AMF set to be used to serve the UE 302, or a list of candidate AMFs based on a suitable configuration and possibly by querying the NRF 354. The selection of a set of network slice instances for the UE 302 may be triggered by the AMF 344 with which the UE 302 is registered by interacting with the NSSF 350, which may lead to a change of AMF. The NSSF 350 may interact with the AMF 344 via an N22 reference point; and may communicate with another NSSF in a visited network via an N31 reference point (not shown). Additionally, the NSSF 350 may exhibit an Nnssf service-based interface.

The NEF 352 may securely expose services and capabilities provided by 3GPP network functions for third party, internal exposure/re-exposure, AFs (e.g., AF 360), edge computing or fog computing systems, etc. In such embodiments, the NEF 352 may authenticate, authorize, or throttle the AFs. NEF 352 may also translate information exchanged with the AF 360 and information exchanged with internal network functions. For example, the NEF 352 may translate between an AF-Service-Identifier and an internal 5GC information. NEF 352 may also receive information from other NFs based on exposed capabilities of other NFs. This information may be stored at the NEF 352 as structured data, or at a data storage NF using standardized interfaces. The stored information can then be re-exposed by the NEF 352 to other NFs and AFs, or used for other purposes such as analytics. Additionally, the NEF 352 may exhibit an Nnef service-based interface.

The NRF 354 may support service discovery functions, receive NF discovery requests from NF instances, and provide the information of the discovered NF instances to the NF instances. NRF 354 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 354 may exhibit the Nnrf service-based interface.

The PCF 356 may provide policy rules to control plane functions to enforce them, and may also support unified policy framework to govern network behavior. The PCF 356 may also implement a front end to access subscription information relevant for policy decisions in a UDR of the UDM 358. In addition to communicating with functions over reference points as shown, the PCF 356 exhibit an Npcf service-based interface.

The UDM 358 may handle subscription-related information to support the network entities' handling of communication sessions, and may store subscription data of UE 302. For example, subscription data may be communicated via an N8 reference point between the UDM 358 and the AMF 344. The UDM 358 may include two parts, an application front end and a UDR. The UDR may store subscription data and policy data for the UDM 358 and the PCF 356, and/or structured data for exposure and application data (including PFDs for application detection, application request information for multiple UEs 302) for the NEF 352. The Nudr service-based interface may be exhibited by the UDR 221 to allow the UDM 358, PCF 356, and NEF 352 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 358 may exhibit the Nudm service-based interface.

The AF 360 may provide application influence on traffic routing, provide access to NEF, and interact with the policy framework for policy control.

In some embodiments, the 5GC 340 may enable edge computing by selecting operator/3rd party services to be geographically close to a point that the UE 302 is attached to the network. This may reduce latency and load on the network. To provide edge-computing implementations, the 5GC 340 may select a UPF 348 close to the UE 302 and execute traffic steering from the UPF 348 to data network 336 via the N6 interface. This may be based on the UE subscription data, UE location, and information provided by the AF 360. In this way, the AF 360 may influence UPF (re)selection and traffic routing. Based on operator deployment, when AF 360 is considered to be a trusted entity, the network operator may permit AF 360 to interact directly with relevant NFs. Additionally, the AF 360 may exhibit an Naf service-based interface.

The data network 336 may represent various network operator services, Internet access, or third party services that may be provided by one or more servers including, for example, application/content server 338.

FIG. 4 schematically illustrates a wireless network 400 in accordance with various embodiments. The wireless network 400 may include a UE 402 in wireless communication with an AN 404. The UE 402 and AN 404 may be similar to, and substantially interchangeable with, like-named components described elsewhere herein.

The UE 402 may be communicatively coupled with the AN 404 via connection 406. The connection 406 is illustrated as an air interface to enable communicative coupling, and can be consistent with cellular communications protocols such as an LTE protocol or a 5G NR protocol operating at mmWave or sub-6 GHz frequencies.

The UE 402 may include a host platform 408 coupled with a modem platform 410. The host platform 408 may include application processing circuitry 412, which may be coupled with protocol processing circuitry 414 of the modem platform 410. The application processing circuitry 412 may run various applications for the UE 402 that source/sink application data. The application processing circuitry 412 may further implement one or more layer operations to transmit/receive application data to/from a data network. These layer operations may include transport (for example UDP) and Internet (for example, IP) operations The protocol processing circuitry 414 may implement one or more of layer operations to facilitate transmission or reception of data over the connection 406. The layer operations implemented by the protocol processing circuitry 414 may include, for example, MAC, RLC, PDCP, RRC and NAS operations.

The modem platform 410 may further include digital baseband circuitry 416 that may implement one or more layer operations that are "below" layer operations performed by the protocol processing circuitry 414 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 410 may further include transmit circuitry 418, receive circuitry 420, RF circuitry 422, and RF front end (RFFE) 424, which may include or connect to one or more antenna panels 426. Briefly, the transmit circuitry 418 may include a digital-to-analog converter, mixer, intermediate frequency (IF) components, etc.; the receive circuitry 420 may include an analog-to-digital converter, mixer, IF components, etc.; the RF circuitry 422 may include a low-noise amplifier, a power amplifier, power tracking components, etc.; RFFE 424 may include filters (for example, surface/bulk acoustic wave filters), switches, antenna tuners, beamforming components (for example, phase-array antenna components), etc. The selection and arrangement of the components of the transmit circuitry 418, receive circuitry 420, RF circuitry 422, RFFE 424, and antenna panels 426 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 414 may include one or more instances of control circuitry (not shown) to provide control functions for the transmit/receive components.

A UE reception may be established by and via the antenna panels 426, RFFE 424, RF circuitry 422, receive circuitry 420, digital baseband circuitry 416, and protocol processing circuitry 414. In some embodiments, the antenna panels 426 may receive a transmission from the AN 404 by receive-beamforming signals received by a plurality of antennas/antenna elements of the one or more antenna panels 426.

A UE transmission may be established by and via the protocol processing circuitry 414, digital baseband circuitry 416, transmit circuitry 418, RF circuitry 422, RFFE 424, and antenna panels 426. In some embodiments, the transmit components of the UE 404 may apply a spatial filter to the data to be transmitted to form a transmit beam emitted by the antenna elements of the antenna panels 426.

Similar to the UE 402, the AN 404 may include a host platform 428 coupled with a modem platform 430. The host platform 428 may include application processing circuitry 432 coupled with protocol processing circuitry 434 of the modem platform 430. The modem platform may further include digital baseband circuitry 436, transmit circuitry 438, receive circuitry 440, RF circuitry 442, RFFE circuitry 444, and antenna panels 446. The components of the AN 404 may be similar to and substantially interchangeable with like-named components of the UE 402. In addition to performing data transmission/reception as described above, the components of the AN 408 may perform various logical functions that include, for example, RNC functions such as radio bearer management, uplink and downlink dynamic radio resource management, and data packet scheduling.

FIG. 5 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 5 shows a diagrammatic representation of hardware resources 500 including one or more processors (or processor cores) 510, one or more memory/storage devices 520, and one or more communication resources 530, each of which may be communicatively coupled via a bus 540 or other interface circuitry. For embodiments where node virtualization (e.g., NFV) is utilized, a hypervisor 502 may be executed to provide an execution environment for one or more network slices/sub-slices to utilize the hardware resources 500.

The processors 510 may include, for example, a processor 512 and a processor 514. The processors 510 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 520 may include main memory, disk storage, or any suitable combination thereof. The memory/storage devices 520 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 530 may include interconnection or network interface controllers, components, or other suitable devices to communicate with one or more peripheral devices 504 or one or more databases 506 or other network elements via a network 508. For example, the communication resources 530 may include wired communication components (e.g., for coupling via USB, Ethernet, etc.), cellular communication components, NFC components, Bluetooth® (or Bluetooth® Low Energy) components, Wi-Fi® components, and other communication components.

Instructions 550 may comprise software, a program, an application, an applet, an app, or other executable code for causing at least any of the processors 510 to perform any one or more of the methodologies discussed herein. The instructions 550 may reside, completely or partially, within at least one of the processors 510 (e.g., within the processor's cache memory), the memory/storage devices 520, or any suitable combination thereof. Furthermore, any portion of the instructions 550 may be transferred to the hardware resources 500 from any combination of the peripheral devices 504 or the databases 506. Accordingly, the memory of processors 510, the memory/storage devices 520, the peripheral devices 504, and the databases 506 are examples of computer-readable and machine-readable media.

Example Procedures

Figure 6:
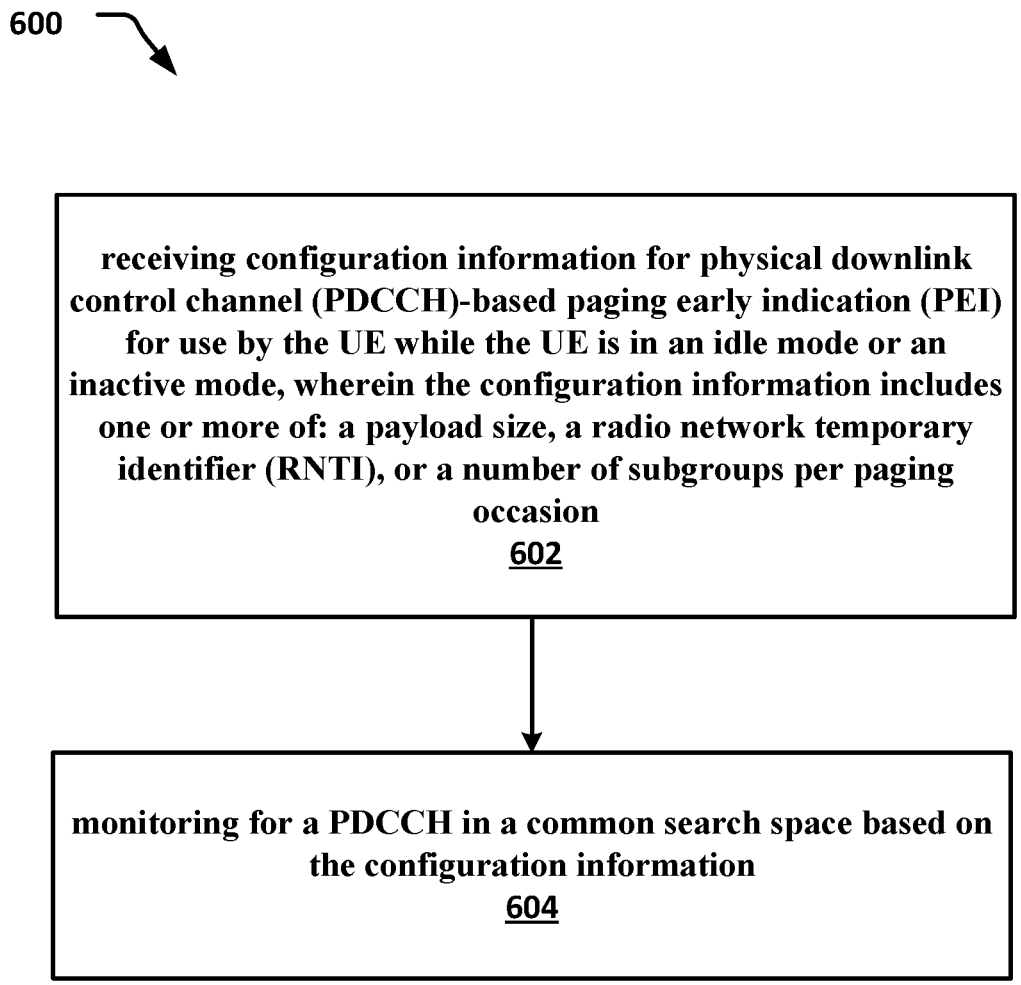
FIG. 6 illustrates an example process to practice various embodiments described herein.

In some embodiments, the electronic device(s), network(s), system(s), chip(s) or component(s), or portions or implementations thereof, of FIG. 3-5, or some other figure herein, may be configured to perform one or more processes, techniques, or methods as described herein, or portions thereof. One such process 600 is depicted in FIG. 6. The process 600 may be performed by a UE or a portion thereof. At 602, the process 600 may include receiving configuration information for physical downlink control channel (PDCCH)-based paging early indication (PEI) for use by the UE while the UE is in an idle mode or an inactive mode, wherein the configuration information includes one or more of: a payload size, a radio network temporary identifier (RNTI), or a number of subgroups per paging occasion. At 604, the process 600 may further include monitoring for a PDCCH in a common search space based on the configuration information. For example, the configuration information may include a PEI-RNTI, and the CRC of the PDCCH may be scrambled by the PEI-RNTI. The PEI-RNTI may be a common RNTI to be used by multiple UEs (e.g., in the same cell).

FIG. 7 illustrates another process 700 in accordance with various embodiments. The process 700 may be performed by a gNB or a portion thereof. At 702, the process may include encode, for transmission to a user equipment (UE), configuration information for physical downlink control channel (PDCCH)-based paging early indication (PEI) for use by the UE while the UE is in an idle mode or an inactive mode, wherein the configuration information includes one or more of: a payload size, a radio network temporary identifier (RNTI), or a number of subgroups per paging occasion. At 704, the process may further include encoding a PDCCH for transmission in a common search space based on the configuration information. For example, the configuration information may include a PEI-RNTI, and the CRC of the PDCCH may be scrambled by the PEI-RNTI. The PEI-RNTI may be a common RNTI to be used by multiple UEs (e.g., in the same cell).

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Some non-limiting examples of various embodiments are provided below.

Example A1 may include One or more non-transitory computer-readable media (NTCRM) having instructions, stored thereon, that when executed by one or more processors of a user equipment (UE) configure the UE to: receive configuration information for physical downlink control channel (PDCCH)-based paging early indication (PEI) for use by the UE while the UE is in an idle mode or an inactive mode, wherein the configuration information includes a PEI-radio network temporary identifier (RNTI); and monitor for a PDCCH in a common search space based on the configuration information.

Example A2 may include the one or more NTCRM of example A1, wherein a cyclic redundancy check (CRC) of the PDCCH is scrambled by the PEI-RNTI.

Example A3 may include the one or more NTCRM of example A1, wherein the configuration information further includes an indication of a payload size or a number of subgroups per paging occasion.

Example A4 may include the one or more NTCRM of example A1, wherein the configuration information is received via a system information block (SIB) or radio resource control (RRC) signaling.

Example A5 may include the one or more NTCRM of example A1, wherein the PEI includes a bitmap, wherein individual bits of the bitmap correspond to one or more paging subgroups to indicate whether paging occasions associated with the respective one or more paging subgroups are to be monitored by the UE.

Example A6 may include the one or more NTCRM of example A5, wherein the bitmap is a first bitmap, wherein the PEI further comprises a second bitmap, and wherein individual bits of the second bitmap correspond to respective tracking reference signal (TRS) resources or resource group sets that are active for the UE.

Example A7 may include the one or more NTCRM of example A6, wherein the second bitmap is concatenated after the first bitmap within a field of the PEI, and wherein the instructions, when executed, are further to cause the UE to: receive an indication of a size of the first or second bitmap; and process the first and second bitmaps based on the indication.

Example A8 may include the one or more NTCRM of example A5, wherein the individual bits of the bitmap are arranged in segments of multiple bits, wherein the segments indicate paging sub-grouping information for respective paging occasions.

Example A9 may include the one or more NTCRM of example A1, wherein a maximum number of PDCCH candidates in the common search space is 4 when an aggregation level is 1, the maximum number of the PDCCH candidates is 2 when the aggregation level is 2, and the maximum number of the PDCCH candidates is 1 when the aggregation level is 4.

Example A10 may include one or more non-transitory computer-readable media (NTCRM) having instructions, stored thereon, that when executed by one or more processors of a next generation Node B (gNB) configure the gNB to: encode, for transmission to a user equipment (UE), configuration information for physical downlink control channel (PDCCH)-based paging early indication (PEI) for use by the UE while the UE is in an idle mode or an inactive mode, wherein the configuration information includes a PEI-radio network temporary identifier (RNTI); and encode a PDCCH for transmission in a common search space based on the configuration information.

Example A11 may include the one or more NTCRM of example A10, wherein a cyclic redundancy check (CRC) of the PDCCH is scrambled by the PEI-RNTI.

Example A12 may include the one or more NTCRM of example A10, wherein the configuration information further includes an indication of a payload size or a number of subgroups per paging occasion.

Example A13 may include the one or more NTCRM of example A10, wherein the PEI includes a bitmap, wherein individual bits of the bitmap correspond to one or more paging subgroups to indicate whether paging occasions associated with the respective one or more paging subgroups are to be monitored by the UE.

Example A14 may include the one or more NTCRM of example A13, wherein the bitmap is a first bitmap, wherein the PEI further comprises a second bitmap, and wherein individual bits of the second bitmap correspond to respective tracking reference signal (TRS) resources or resource group sets that are active for the UE.

Example A15 may include the one or more NTCRM of example A14, wherein the first and second bitmaps are concatenated within a field of the configuration information, and wherein the instructions, when executed, are further to cause the gNB to indicate, to the UE, a size of the first or second bitmap.

Example A16 may include the one or more NTCRM of example A13, wherein the individual bits of the bitmap are arranged in segments of multiple bits, wherein the segments indicate paging sub-grouping information for respective paging occasions.

Example A17 may include the one or more NTCRM of example A10, wherein the instructions, when executed, are further to cause the gNB to determine a number of PDCCH candidates of the common search space based on an aggregation level.

Example A18 may include the one or more NTCRM of example A17, wherein a maximum number of the PDCCH candidates is 4 when the aggregation level is 1, the maximum number of the PDCCH candidates is 2 when the aggregation level is 2, and the maximum number of the PDCCH candidates is 1 when the aggregation level is 4.

Example B1 may include a method of a UE, the method comprising: receiving a first configuration of PDCCH PEI by system information block (SIB), wherein the first configuration includes at least a common RNTI, a common search space (CSS), a payload, an offset to identify monitoring occasions (MOs); monitoring and receiving PDCCH PEI signal prior to the paging occasion (PO) at the indicated offset; and monitoring the PO when PEI provides wake-up indication for the UE.

Example B2 may include the method of example B1 or some other example herein, wherein the CSS is the paging search space.

Example B3 may include the method of example B1 or some other example herein, wherein the offset is used to derive MOs with respect to the MOs of PO the UE is monitoring.

Example B4 may include the method of example B1 or B3 or some other example herein, wherein the offset is expressed in number of MOs.

Example B5 may include the method of example B1 or some other example herein, wherein PEI includes TRS availability indication and/or UE paging sub-grouping information.

Example B6 may include the method of example B1 or B5 or some other example herein, wherein UE ignores TRS availability indication if PEI does not indicate wake-up for the UE's group or sub-group for a PO.

Example Z01 may include an apparatus comprising means to perform one or more elements of a method described in or related to any of examples A1-A18, B1-B6, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples A1-A18, B1-B6, or any other method or process described herein.

Example Z03 may include an apparatus comprising logic, modules, or circuitry to perform one or more elements of a method described in or related to any of examples A1-A18, B1-B6, or any other method or process described herein.

Example Z04 may include a method, technique, or process as described in or related to any of examples A1-A18, B1-B6, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples A1-A18, B1-B6, or portions thereof.

Example Z06 may include a signal as described in or related to any of examples A1-A18, B1-B6, or portions or parts thereof.

Example Z07 may include a datagram, packet, frame, segment, protocol data unit (PDU), or message as described in or related to any of examples A1-A18, B1-B6, or portions or parts thereof, or otherwise described in the present disclosure.

Example Z08 may include a signal encoded with data as described in or related to any of examples A1-A18, B1-B6, or portions or parts thereof, or otherwise described in the present disclosure.

Example Z09 may include a signal encoded with a datagram, packet, frame, segment, protocol data unit (PDU), or message as described in or related to any of examples A1-A18, B1-B6, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples A1-A18, B1-B6, or portions thereof.

Example Z11 may include a computer program comprising instructions, wherein execution of the program by a processing element is to cause the processing element to carry out the method, techniques, or process as described in or related to any of examples A1-A18, B1-B6, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| AC | Application Client |
| ACR | Application Context Relocation |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AOA | Angle of Arrival |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CDR | Charging Data Request |
| CDR | Charging Data Response |
| CFRA | Contention Free Random Access |
| CG | Cell Group |
| CGF | Charging Gateway Function |
| CHF | Charging Function |
| CI | Cell Identity |
| CID | Cell-ID (e g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSCF | call session control function |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell- specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| EAS | Edge Application Server |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |

| | |
|---|---|
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-U | GPRS Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IIOT | Industrial Internet of Things |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN |
| | Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LMF | Location Management Function |
| LOS | Line of Sight |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-I | MAC used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |

| | |
|---|---|
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non- Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |

| | |
|---|---|
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-CSCF | serving CSCF |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDT | Small Data Transmission |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH Block SSBRI | SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |

-continued

| | |
|---|---|
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over- Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

APPENDIX

This appendix provides an example submission to 3GPP in accordance with various embodiments described herein.

Introduction

The Rel-17 work item on UE power saving enhancements [1] includes the following objective for paging enhancements targeting enhanced UE power savings:

- Specify enhancements for idle/inactive-mode UE power saving, considering system performance aspects [RAN2, RAN1]
  o Study and specify paging enhancement(s) to reduce unnecessary UE paging receptions, subject to no impact to legacy UEs [RAN2, RAN1]
    ♦ NOTE: RAN1 to check and update, if needed, evaluation methodology in RAN1 #100 meeting In RAN #93e, the following was agreed with regards to paging enhancements in idle/inactive mode Support PDCCH-based PEI as the only option
- Only essential function for PEI is support
  - New DCI format
  - Higher layer configuration, including SS
  - Details of the procedures of PEI monitoring, and identification of MOs before PO
  - Only Behv-A (per RAN1#104e agreement) is supported
  - If TRS availability indication is agreed to be supported in both paging DCI and the DCI format for PEI, same mechanism/principle for TRS availability indication is adopted for the two DCI formats
  - Supporting TRS availability indication in DCI format for PEI shall not delay the completion of essential functionality of PEI In this contribution, we express our views on design details of PDCCH PEI.

1 Configuration and Design of PDCCH PEI 1.1 Essential Functionality of PEI

Based on RAN #93e guidance, it is expected that RAN1 would continue to work on PDCCH based PEI design to support essential functions only. In our view, essential function for PEI only includes provided UE paging sub-grouping information. TRS availability indication can be provided by paging DCI anyways, and there is no strong need to duplicate the functionality via another DCI.

Proposal 1: Essential function of PEI includes providing indication for UE paging sub-grouping information only.

1.2 UE Sub-Grouping Indication

It is still open in RAN1 whether PEI and/or paging DCI would carry UE sub-grouping information for a PO. Since PDCCH PEI is agreed and PEI provides higher power saving than paging DCI when sub-grouping indication is provided, we suggest to adopt PDCCH PEI based UE sub-grouping indication. A bitmap comprising N bits can be includes in the DCI where N can be up to 8, e.g., maximum number of subgroups per PO.

Proposal 2: When configured, PDCCH PEI provides UE paging sub-grouping indication.

A bitmap of size up to 8 bits can be used in the DCI. No other indications are provided via PDCCH-based PEI.

1.3 PEI Association to One or Multiple POsb

In our view, 1 PEI to 1 PO association should be baseline consideration and should be regarded as essential functionality of PEI. It has been heavily debated in RAN1 104e and RAN1 105e regarding 1 PEI to multiple PO association. In our view, 1 PEI to multiple PO has the following issue. In such case, PEI may indicate sub-groups which span multiple POs. Hence, gap between PEI monitoring occasion and PO for a given UE can be large which can increase paging latency and also feasibility/practicality of such a-priori determination by gNB much ahead of a PO is questionable. Proponents argue that at high PO density scenario, one to many association is useful, such as one PEI can provide the wake-up information of one/multiple POs of one/multiple PFs, which is much suitable for high system PO density scenario. In our view, high PO density implies paging rate would most likely be higher and for this, need for PEI is questionable.

Observation 1: Need for PEI at high paging load is questionable.

1 PEI to multiple PO association is not an essential functionality of PEI.

Proposal 3: 1 PEI to 1 PO is supported only for Rel-17 PEI design.

1.4 PDCCH PEI Configuration

In our view, UE can be provided with the following relevant parameters as part of PDCCH PEI configuration based on new DCI format x-y, such as via SIB:
- A common RNTI such as P-RNTI or PEI-RNTI where the CRC of the DCI format x-y for transmission of the PDCCH based PEI is scrambled by that RNTI for monitoring the DCI format in one or more search space sets on the primary cell of the MCG
- A payload size of DCI format x-y such as by a higher layer parameter size-DCI-x-y, if the payload is configurable. Alternatively, the payload of the DCI format x-y can be fixed as well such as 12 bits. If only paging UE sub-group information is included, then fixed 12 bits seems sufficient.
- Identifier what information will be contained in the DCI format x-y, such as the DCI format can be used to provide information on one or more of: UE sub-grouping information, TRS availability indication (if agreed). If both are included, the identification of number of bits for each of this information is also provided.
- CORESET and SS set configuration
    We suggest to use CORESET 0 and paging search space for simplicity and reducing spec efforts/unnecessary higher layer signaling.
    Dedicated CORESET configuration or a separate CSS configuration is not strongly needed.
- An offset to identify the MOs before PO
    The offset can be used to derive the MOs of PEI with respect to the MOs of a PO.
    CCE Aggregation Levels (ALs), such as 1, 2, 4, 8, 16, and maximum number of PDCCH candidates per CCE AL. Alternatively, these can be specified and not separately provided as configuration. Example is provided below in Table 1.

TABLE 1

CCE ALs and numbers of candidates for PDCCH CSS set for PEI monitoring.

| CCE Aggregation Level | Number of Candidates |
| --- | --- |
| 4 | 4 |
| 8 | 2 |
| 16 | 1 |

Proposal 4: CORESET 0 and paging search space can be used for PDCCH PEI monitoring.

Proposal 5: Discuss DCI payload (whether it can be fixed or configurable) after agreeing on what information content can be signalled via PEI.
  Higher layer parameter on configured number of sub-groups per PO or size of the bitmap for UE sub-grouping information is needed.

Proposal 6: An offset is configured to derive MOs for PEI monitoring with respect to the MOs of PO addressed by the PEI.

1.5 Identification of MOs for PEI Monitoring

In our view, paging search space can be reused in a simple manner to identify MOs for PDCCH PEI monitoring. The procedure can be as follows assuming 1 PEI to 1 PO association.

If the UE is monitoring (i_s+1)th PO and SearchSpaceId other than 0 is configured for pagingSearchSpace, the start of monitoring occasions for PEI before (i_s+1)th PO can be obtained as (i_s+1)th value in firstPDCCH-MonitoringOccasionOfPO—offset, where offset is expressed in number of MOs. In other words, S*X MOs of PEI can be obtained at an offset before the S*X MOs comprising the PO which is addressed by the PEI, where the first MO of the S*X MOs of PEI is obtained as (i_s+1)th value in firstPDCCH-MonitoringOccasionOfPO—offset. FIG. 1 shows how first MO of PEI monitoring before (i_s+1)th PO can be obtained at an offset before the first MO of PO. In this example, it is assumed that each of PEI monitoring window and PO comprises S*X consecutive MOs in total, where 'S' is the number of actual transmitted SSBs and X is the number of PDCCH MOs per SSB, assuming multi-beam scenario. If firstPDCCH-MonitoringOccasionOfPO is not provided, then first MO of PEI monitoring before (i_s+1)th PO can be obtained as i_s*S*X—offset.

We do not see the necessity to couple SSB location for identifying start of MOs for PEI monitoring. Also, there is no strong need to configure or specify a minimum time gap needed between last MO of PEI monitoring and start of PO. This is up to gNB implementation. It is much simpler to reuse existing paging DCI monitoring mechanism and use start of PO as reference point to configure the offset.

Proposal 7: PEI monitoring window includes same total number of MOs per PO, such as S*X consecutive MOs in total, where 'S' is the number of actual transmitted SSBs and X is the number of PDCCH MOs per SSB.

Proposal 8. First MO for PEI monitoring is identified at an offset before the first MO of the PO addressed by the PEI.

Proposal 9. Do not support configuration of a minimum time gap between last MO of PEI monitoring and start of PO.

2 UE Behavior Upon Detecting PEI

Behv-A such as follows was agreed in RAN #93e

Behv-A:
  PEI indicates UE should monitor a PO if UE's group/subgroup is paged
  UE is not required to monitor a PO if UE does not detect PEI at all PEI occasion(s) for the PO If TRS availability indication by PEI is agreed, it needs to be discussed whether following TRS availability indication by PEI is dependent on whether UE is indicated to monitor a PO by PEI. In our view, a UE may detect the PEI and follow the TRS availability indication (if agreed and provided in PEI) regardless of whether same PEI indicates wake up or not for UE's paging group or sub-group. In other words, following the TRS availability indication by PEI can be independent of whether PEI includes wake up information of the UE's paging group/sub-group or not.

Proposal 10: UE may follow TRS availability indication (if agreed) by PEI regardless of whether UE is indicated to monitor PO or not by the same PEI.

3 Conclusions

In summary, we have following list of proposals and observation:

Observation 1: Need for PEI at high paging load is questionable.

1 PEI to multiple PO association is not an essential functionality of PEI.

Proposal 1: Essential function of PEI includes providing indication for UE paging sub-grouping information only.

Proposal 2: When configured, PDCCH PEI provides UE paging sub-grouping indication.

A bitmap of size up to 8 bits can be used in the DCI.
No other indications are provided via PDCCH-based PEI.

Proposal 3: 1 PEI to 1 PO is supported only for Rel-17 PEI design.

Proposal 4: CORESET 0 and paging search space can be used for PDCCH PEI monitoring.

Proposal 5: Discuss DCI payload whether it can be fixed or configurable after agreeing on what information content can be signalled via PEI.

Higher layer parameter on configured number of subgroups per PO or size of the bitmap for UE sub-grouping information is needed.

Proposal 6: An offset is configured to derive MOs for PEI monitoring with respect to the MOs of PO addressed by the PEI.

Proposal 7: PEI monitoring window includes same total number of MOs per PO, such as S*X consecutive MOs in total, where 'S' is the number of actual transmitted SSBs and X is the number of PDCCH MOs per SSB.

Proposal 8. First MO for PEI monitoring is identified at an offset before the first MO of the PO addressed by the PEI.

Proposal 9. Do not support configuration of a minimum time gap between last MO of PEI monitoring and start of PO.

Proposal 10: UE may follow TRS availability indication (if agreed) by PEI regardless of whether UE is indicated to monitor PO or not by the same PEI.

The invention claimed is:

1. One or more non-transitory computer-readable media (NTCRM) having instructions, stored thereon, that when executed by one or more processors of a user equipment (UE) configure the UE to:
   receive configuration information for physical downlink control channel (PDCCH)-based paging early indication (PEI) for use by the UE while the UE is in an idle state or an inactive state, the configuration information for the PDCCH-based PEI including a PEI-radio network temporary identifier (RNTI); and
   monitor paging occasions for a PDCCH in a common search space based on the configuration information for the PDCCH-based PEI,
   wherein the configuration information for the PDCCH-based PEI indicates: one or more paging subgroups, whether paging occasions associated with a respective one or more of the paging subgroups are to be monitored by the UE, and for the paging subgroups that are to be monitored by the UE, respective tracking reference signal (TRS) resources that are indicated to be present during corresponding ones of the paging occasions, and
   wherein the UE is configured to use the respective TRS resources that are indicated to be present during corresponding ones of the paging occasions while the UE is in the inactive or idle state for paging reception mode prior to a paging occasion that is to be monitored.

2. The one or more NTCRM of claim 1, wherein a cyclic redundancy check (CRC) of the PDCCH is scrambled by the PEI-RNTI.

3. The one or more NTCRM of claim 1, wherein the configuration information further includes an indication of a payload size or a number of subgroups per paging occasion.

4. One or more non-transitory computer-readable media (NTCRM) having instructions, stored thereon, that when executed by one or more processors of a user equipment (UE) configure the UE to:
   receive configuration information for physical downlink control channel (PDCCH)-based paging early indication (PEI) for use by the UE while the UE is in an idle mode or an inactive mode, wherein the configuration information includes a PEI-radio network temporary identifier (RNTI); and
   monitor for a PDCCH in a common search space based on the configuration information, wherein the configuration information for the PDCCH-based PEI includes a first number of bits that correspond to a number of paging subgroups per paging occasion and a number of paging occasions associated with a number of PDCCH monitoring occasions to be monitored by the UE,
   wherein the configuration information for the PDCCH-based PEI comprises a second number of bits comprising a bitmap, and wherein individual bits of the bitmap indicate presence of associated tracking reference signal (TRS) resource sets for use by the UE during paging reception, and
   wherein the configuration information for PDCCH-based PEI is a downlink control information (DCI) format, and wherein the configuration information for the PDCCH-based PEI includes a payload size of the DCI format.

5. One or more non-transitory computer-readable media (NTCRM) having instructions, stored thereon, that when executed by one or more processors of a user equipment (UE) configure the UE to:
   receive configuration information for physical downlink control channel (PDCCH)-based paging early indication (PEI) for use by the UE while the UE is in an idle mode or an inactive mode, wherein the configuration information includes a PEI-radio network temporary identifier (RNTI); and
   monitor for a PDCCH in a common search space based on the configuration information, wherein:
   when an aggregation level is 4, a maximum number of PDCCH candidates is 4,
   when an aggregation level is 8, the maximum number of PDCCH candidates is 2, and
   when an aggregation level is 16, the maximum number of PDCCH candidates is 1.

6. One or more non-transitory computer-readable media (NTCRM) having instructions, stored thereon, that when executed by one or more processors of a next generation Node B (gNB) configure the gNB to:
   encode, for transmission to a user equipment (UE), configuration information for physical downlink control channel (PDCCH)-based paging early indication (PEI) for use by the UE while the UE is in an idle mode or an inactive mode, wherein the configuration information includes a PEI-radio network temporary identifier (RNTI); and
   encode a PDCCH for transmission in a common search space based on the configuration information, wherein the instructions, when executed, are further to cause the gNB to determine a number of PDCCH candidates of the common search space based on an aggregation level, wherein:

when an aggregation level is 4, a maximum number of PDCCH candidates is 4,when an aggregation level is 8, the maximum number of PDCCH candidates is 2, and when an aggregation level is 16, the maximum number of PDCCH candidates is 1.

wherein a maximum number of the PDCCH candidates is 4 when the aggregation level is 1, the maximum number of the PDCCH candidates is 2 when the aggregation level is 2, and the maximum number of the PDCCH candidates is 1 when the aggregation level is 4.

7. The one or more NTCRM of claim 6, wherein a cyclic redundancy check (CRC) of the PDCCH is scrambled by the PEI-RNTI.

8. The one or more NTCRM of claim 6, wherein the configuration information further includes an indication of a payload size or a number of subgroups per paging occasion.

9. The one or more NTCRM of claim 6, wherein the configuration information for the PDCCH-based PEI includes a first number of bits that correspond to a number of paging subgroups per paging occasion and a number of paging occasions associated with a number of PDCCH monitoring occasions to be monitored by the UE.

10. The one or more NTCRM of claim 9, wherein the configuration information for the PDCCH-based PEI comprises a second number of bits comprising a bitmap, and wherein individual bits of the bitmap indicate presence of associated tracking reference signal TRS) resource sets for use by the UE during paging reception.

* * * * *